United States Patent [19]

Ritze

[11] 4,297,142
[45] Oct. 27, 1981

[54] OPTICAL COLORED AND FILTER GLASS

[75] Inventor: Willy Ritze, Mainz, Fed. Rep. of Germany

[73] Assignee: Jenaer Glaswerk, Schott & Gen., Mainz, Fed. Rep. of Germany

[21] Appl. No.: 159,700

[22] Filed: Jun. 16, 1980

[30] Foreign Application Priority Data

Jul. 3, 1979 [DE] Fed. Rep. of Germany ....... 2926721

[51] Int. Cl.³ .......................... C03C 3/16; C03C 3/24
[52] U.S. Cl. ...................... 501/77; 501/78; 501/79; 252/582
[58] Field of Search ...................... 106/47 Q, 47 R, 54

[56] References Cited

U.S. PATENT DOCUMENTS

| | | | |
|---|---|---|---|
| 3,785,835 | 1/1974 | Izumitani | 106/47 Q |
| 3,923,527 | 12/1975 | Matsuura et al. | 106/47 Q |
| 4,026,714 | 5/1977 | Lewis | 106/47 Q |
| 4,105,577 | 8/1978 | Yamashita | 252/300 |
| 4,229,220 | 10/1980 | Hirota | 106/47 R |

OTHER PUBLICATIONS

Weyl, W. A., Colored Glasses–(1967), pub. by Soc. of Glass Technology, Sheffield, Eng., pp. 230, 504–505.

*Primary Examiner*—Helen M. McCarthy
*Attorney, Agent, or Firm*—Haight, Rosfeld & Noble

[57] ABSTRACT

Low alkali, high phosphate and high $Al_2O_3$ content glasses are described which are highly suitable for optical colored and filter glasses. They exhibit a glass transformation temperature $Tg > 450°$ C. and have the following composition, in percent by weight:

| | |
|---|---|
| $P_2O_5$ | 71.0–76.0 |
| $SiO_2$ | 0.25–2.5 |
| $B_2O_3$ | 2.4–3.75 |
| $Al_2O_3$ | 8.6–11.6 |
| $R_2O$ (alkali oxide) | 1.25–6.5 |
| CaO | 0.5–1.65 |
| MgO | 2.0–3.5 |
| Refining Agent | 0.2–0.6 |
| $CeO_2$ | 0.1–0.4 |
| F' | 0.2–0.4 and |
| CuO | 1.0–10.0. |

7 Claims, 1 Drawing Figure

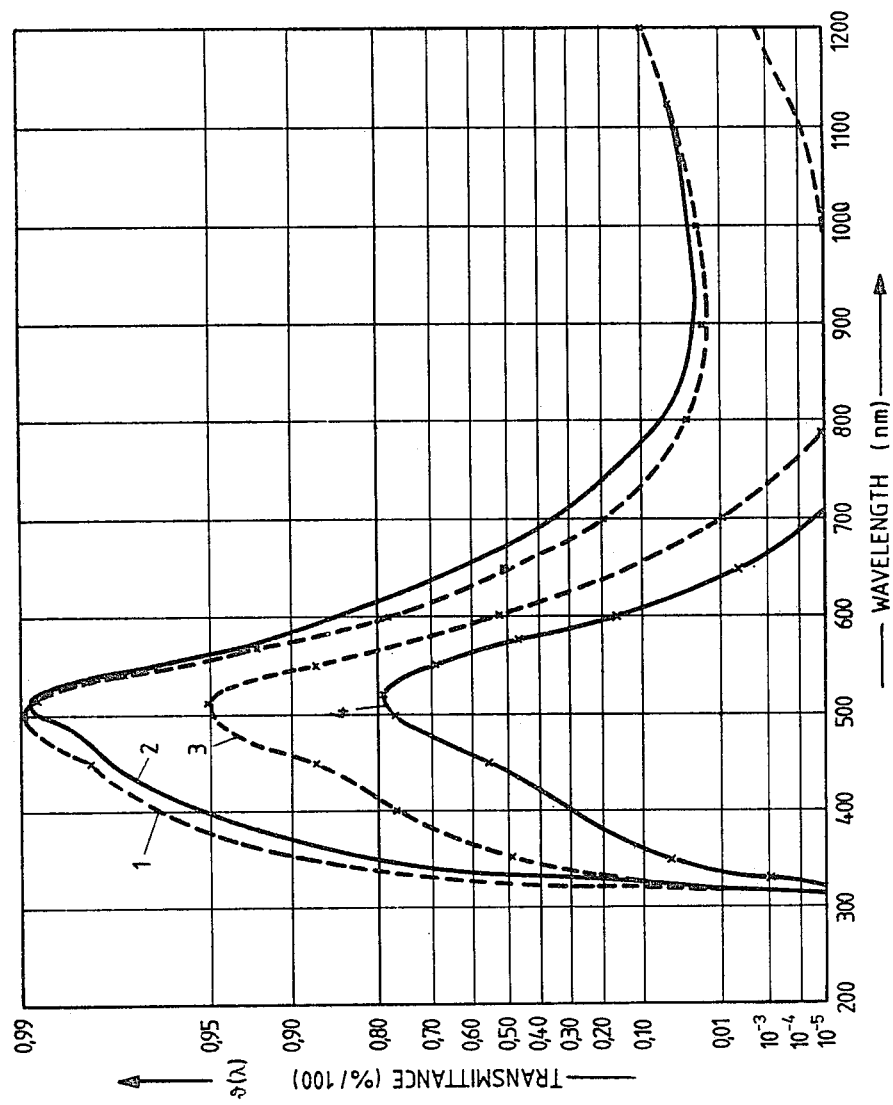

OPTICAL COLORED AND FILTER GLASS

DESCRIPTION OF THE INVENTION

Technical Field

This invention relates to a low alkali content phosphate glass having an extremely high content of $Al_2O_3$, which can serve as a basic glass material for the manufacture of CuO-colored filter glasses characterized by good optical quality as regards streaks (schliere) and bubbles.

Background Art

CuO-colored phosphate glasses are known in the prior art; however, they are characterized by a relatively low glass transformation temperature (Tg). Accordingly, it is a general object of the present invention to provide an improved CuO-colored phosphate glass as a basic glass material for optical colored and filter glasses, which is characterized by a favorable optical transmission/absorption spectrum, by increased crystallization stability, by relatively good chemical stability, and especially by a high glass transformation temperature, preferably Tg>450° C.

Disclosure of the Invention

Briefly, the above and other objects, features and advantages of the present invention are attained in one aspect thereof by providing a low alkali, high phosphate content glass for optical colored and filter glasses having an extremely high $Al_2O_3$ content and characterized by the following composition, in percent by weight:

| | |
|---|---|
| $P_2O_5$ | 71.0–76.0 |
| $SiO_2$ | 0.25–2.5 |
| $B_2O_3$ | 2.4–3.75 |
| $Al_2O_3$ | 8.6–11.6 |
| $R_2O$ (alkali oxides) | 1.25–6.5 |
| CaO | 0.5–1.65 |
| MgO | 2.0–3.5 |
| Refining Agent(s) | 0.2–0.6 |
| $CeO_2$ | 0.1–0.4 |
| F' | 0.2–0.4 |
| CuO | 1.0–10.0 | preferably with

| | |
|---|---|
| $Na_2O$ | 0.25–1.1 |
| $K_2O$ | 1.0–4.85 |
| $Li_2O$ | 0.–1.2 |
| BaO | 0.–2.0 |
| SrO | 0.–2.0 |
| ZnO | 0.–1.75 |
| $As_2O_3 + Sb_2O_3$ | |
| $+ Sb_2O_5$ | |

The glasses of the present invention can be melted to an excellent optical quality in large melting units of platinum which are customarily used for the production of optical colored glasses, while avoiding any signs of corrosion on the precious metal (Pt). The maximum dimensions of the producible copper phosphate glass filter are within a volume of 500×500×150 mm.

Optimum transmission and/or absorption properties for the spectral range of 350 nm to 1100 nm are achieved by the colored glass of the invention, with the characteristic maximum transmission value lying between 500 and 525 nm. The transmission sequence can be adjusted accurately within the given spectral range to ±0.5 percent during production by varying the composition, e.g. as shown for Examples 1-4 in the Drawing.

Melting down is done preferably in Pt-melting units at temperatures of 1250° to 1360° C., depending primarily on the $Al_2O_3$ and alkali boric oxide additive contents. For a calculated glass quantity of about 1000 kg, melting down takes place during 10–12 hours.

Refining to form a fusion blank and degassing of such a phosphate glass paste is generally done at temperatures of 1240° to 1300° C. After a settling period of about 2–3 hours at 1050° to 950° C., the glass mixture is homogenized thoroughly by means of agitators adapted for this special glass composition.

The resulting copper phosphate filter glass is subsequently poured in forms, rolled into disks or processed into preforms. Cooling preferably takes place in electrically heated furnaces, which slowly cool down the hot glass (preferably with a rate of temperature decrease of 1° to 4° per hour) to a normal room temperature of about 25° C., and hence the stress is relieved to a great degree.

BRIEF DESCRIPTION OF THE DRAWING

The above and other objects, features and advantages of the present invention will become more fully apparent to those skilled in the art to which this invention pertains from the following Disclosure of the Invention, taken in conjunction with the annexed Drawing, which plots the optical transmissions at various wavelengths for the compositions of Examples 1 thru 4 reported herein.

Best Mode for Carrying Out the Invention

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

Example 1

To produce 100 kg of a blue phosphate filter glass, the following composition was thoroughly mixed to form a uniform glass mixture:

0.751 kg Calcium silicate, $CaSiO_3$
10.397 kg Borophosphate, $BPO_4$
2.226 kg Barium nitrate, $Ba(NO_3)_2$
2.888 kg Sodium nitrate, $NaNO_3$
3.598 kg Potassium carbonate, $K_2CO_3$
3.548 kg Potassium nitrate, $KNO_3$
1.158 kg Zinc oxide, ZnO
1.884 kg Calcium methaphosphate, $Ca(PO_3)_2$
45.545 kg Aluminum metaphosphate, $Al(PO_3)_3$
0.454 kg Potassium bifluoride, $KHF_2$
1.113 kg Lithium carbonate, $Li_2CO_3$
0.200 kg Cerium oxide, $CeO_2$
14.796 kg Magnesium metaphosphate, $Mg(PO_3)_2$
16.900 kg Phosphoric pentoxide, $P_2O_5$
0.450 kg Arsenic oxide, $As_2O_3$ and
1.900 kg Copper-II-oxide, CuO 107.808 kg total composition.

This glass mixture is melted at 1230° to 1250° C. for about 4 hours. Refining and degassing of the molten glass takes place at a temperature range of 1270° to 1240° C. for a period of 60 minutes. Final stirring and homogenizing of the molten mixture is carried out at a temperature range of 1240° to 1120° C. The period necessary for this purpose is generally between 75 and 90 minutes. The finished optical colored glass mixture can then be poured into preheated iron forms. The volume of the cast glass blocks obtained in this manner may amount to as much as 50 kg. Cooling of these glass pieces is usually carried out in an electrical furnace. The rate of cooling amounts to 1° to 2° C. per hour and it occurs from the transformation range (Tg) down to a normal temperature of 25° C. The optical quality of this copper phosphate glass is excellent as regards streaks (schliere) and bubbles or other enclosures.

Examples 2-4

Following the procedure of Example 1, additional compositions shown in the following Table were produced with analagous results.

TABLE

| Example | 1 | 2 | 3 | 4 |
|---|---|---|---|---|
| $SiO_2$, percent | 0.50 | 0.90 | 2.35 | 1.70 |
| $B_2O_3$ | 3.40 | 3.25 | 2.45 | 2.35 |
| $Na_2O$ | 1.05 | 0.90 | 0.40 | 0.45 |
| $K_2O$ | 4.30 | 1.20 | 1.45 | 1.30 |
| $Li_2O$ | 0.45 | — | 0.80 | 1.00 |
| CaO | 0.55 | 1.65 | 0.65 | 1.25 |
| BaO | 1.30 | — | 0.25 | 0.25 |
| MgO | 2.90 | 3.00 | 2.65 | 2.30 |
| ZnO | 1.15 | — | 0.20 | 0.10 |
| $Al_2O_3$ | 8.70 | 10.95 | 8.65 | 8.60 |
| $CeO_2$ | 0.20 | 0.35 | 0.25 | 0.10 |
| F' | 0.25 | 0.35 | 0.40 | 0.30 |
| CuO | 1.90 | 1.60 | 5.30 | 8.90 |
| $P_2O_5$ | 72.90 | 75.60 | 73.80 | 71.05 |
| $As_2O_3$ | 0.45 | 0.25 | 0.40 | 0.35 |
| nd | 1.5309 | 1.5299 | 1.5412 | 1.5450 |
| Tg | 485° C. | 565° C. | 482° C. | 475° C. |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in providing a basic glass material for the manufacture of CuO-colored filter glasses of good optical quality.

What is claimed is:

1. A low alkali, high phosphate and high $Al_2O_3$ content glass suitable for optical colored and filter glasses characterized by having a glass transformation temperature Tg>450° C. and consisting essentially of the following composition, in percent by weight:

| | |
|---|---|
| $P_2O_5$ | 71.0–76.0 |
| $SiO_2$ | 0.25–2.5 |
| $B_2O_3$ | 2.4–3.75 |

-continued

| | |
|---|---|
| $Al_2O_3$ | 8.6–11.6 |
| $R_2O$ (alkali oxide) | 1.25–6.5 |
| CaO | 0.5–1.65 |
| MgO | 2.0–3.5 |
| Refining Agent | 0.2–0.6 |
| $CeO_2$ | 0.1–0.4 |
| F' | 0.2–0.4 and |
| CuO | 1.0–10.0. |

2. A composition according to claim 1, containing

| | |
|---|---|
| $Na_2O$ | 0.25–1.1 |
| $K_2O$ | 1.00–4.85 |
| $Li_2O$ | 0.–1.2 |
| BaO | 0.–2.0 |
| SrO | 0.–2.0 |
| ZnO | 0.–1.75 and |
| $As_2O_3 + Sb_2O_3$ + $Sb_2O_5$ | 0.2–0.6. |

3. A composition according to claim 1 having nd=1.5309 and Tg=485° C., consisting essentially of the following ingredients:

| | |
|---|---|
| $P_2O_5$ | 72.90 |
| $SiO_2$ | 0.50 |
| $B_2O_3$ | 3.40 |
| $Al_2O_3$ | 8.70 |
| $Na_2O$ | 1.05 |
| $K_2O$ | 4.30 |
| $Li_2O$ | 0.45 |
| CaO | 0.55 |
| MgO | 2.90 |
| $As_2O_3$ | 0.45 |
| $CeO_2$ | 0.20 |
| F' | 0.25 |
| CuO | 1.90 |
| BaO | 1.30 and |
| ZnO | 1.15. |

4. A composition according to claim 1 having nd=1.5299 and Tg=565° C., consisting essentially of the following ingredients:

| | |
|---|---|
| $P_2O_5$ | 75.60 |
| $SiO_2$ | 0.90 |
| $B_2O_3$ | 3.25 |
| $Al_2O_3$ | 10.95 |
| $Na_2O$ | 0.90 |
| $K_2O$ | 1.20 |
| CaO | 1.65 |
| MgO | 3.00 |
| $As_2O_3$ | 0.25 |
| $CeO_2$ | 0.35 |
| F' | 0.35 and |
| CuO | 1.60. |

5. A composition according to claim 1 having nd=1.5412 and Tg=482° C., consisting essentially of the following ingredients:

| | |
|---|---|
| $P_2O_5$ | 73.80 |
| $SiO_2$ | 2.35 |
| $B_2O_3$ | 2.45 |
| $Al_2O_3$ | 8.65 |
| $Na_2O$ | 0.40 |
| $K_2O$ | 1.45 |
| $Li_2O$ | 0.80 |
| CaO | 0.65 |
| MgO | 2.65 |
| $As_2O_3$ | 0.40 |
| $CeO_2$ | 0.25 |

| | |
|---|---|
| F' | 0.40 |
| CuO | 5.30 |
| BaO | 0.25 and |
| ZnO | 0.20. |

6. A composition according to claim 1 having $n_d = 1.5450$ and $T_g = 475°$ C., consisting essentially of the following ingredients:

| | |
|---|---|
| $P_2O_5$ | 71.05 |
| $SiO_2$ | 1.70 |
| $B_2O_3$ | 2.35 |
| $Al_2O_3$ | 8.60 |
| $Na_2O$ | 0.45 |
| $K_2O$ | 1.30 |
| $Li_2O$ | 1.00 |
| CaO | 1.25 |
| MgO | 2.30 |
| $As_2O_3$ | 0.35 |
| $CeO_2$ | 0.10 |
| F' | 0.30 |
| CuO | 8.90 |
| BaO | 0.25 and |
| ZnO | 0.10. |

7. The composition according to any one of claims 1 thru 6 in the form of an optical filter glass.

* * * * *